United States Patent [19]

Nicholson

[11] Patent Number: 5,784,156

[45] Date of Patent: Jul. 21, 1998

[54] FIBER OPTIC GUIDANCE SYSTEM FOR LASER GUIDED MISSILES

[75] Inventor: James E. Nicholson, Pineville, La.

[73] Assignee: Tracor Aerospace, Inc., Austin, Tex.

[21] Appl. No.: 752,326

[22] Filed: Nov. 19, 1996

[51] Int. Cl.⁶ .............................. G01B 11/26; F41G 7/00
[52] U.S. Cl. ........................... 356/141.5; 244/3.16
[58] Field of Search .................. 356/141.5; 385/116; 244/3.16

[56] References Cited

U.S. PATENT DOCUMENTS

| | | |
|---|---|---|
| 4,674,874 | 6/1987 | Halldorsson et al. . |
| 4,682,024 | 7/1987 | Halldorsson et al. . |
| 4,696,441 | 9/1987 | Jones et al. . |
| 4,825,063 | 4/1989 | Halldorsson et al. . |
| 4,880,305 | 11/1989 | Salt ............................. 356/141 |
| 4,914,284 | 4/1990 | Halldorsson et al. . |
| 4,923,276 | 5/1990 | Wells . |
| 4,942,291 | 7/1990 | Dietrich . |
| 4,952,042 | 8/1990 | Pinson . |
| 4,962,311 | 10/1990 | Poisel et al. . |
| 5,014,621 | 5/1991 | Fox et al. . |
| 5,052,635 | 10/1991 | Paulet et al. . |
| 5,103,088 | 4/1992 | Halldorsson et al. . |
| 5,114,227 | 5/1992 | Cleveland . |
| 5,225,894 | 7/1993 | Nicholson et al. . |

Primary Examiner—Mark Hellner

[57] ABSTRACT

The invention provides a system and a method for determining the direction to a radiating source, for use by a vehicle guidance system, in which optical fibers are used to both collect and transmit optical signals in which the vehicle is preferably intended to home in on its target. The optical fibers disclosed herein require no separate collection optics, but instead directly collect incident radiation arriving at one end of the optical fiber for transmission to a photodiode detector coupled to the distal end. Preferably the radiation is laser radiation radiating from a target in relation to which the vehicle is guided, and preferably the vehicle is a guided missile. Elimination of collection optics reduces the complexity and cost of the apparatus and provides an unexpected increase in and selectability of the accuracy of directional determination by the system. The system includes an array of apertures disposed in selected, non-uniform locations on the vehicle. Each aperture contains a set of fibers, including start and stop fibers. The fibers receive incoming radiation, transmit the radiation as optical signals to start and stop detectors. The detectors measure a signal strength and a property related to the length of the start and stop fibers through which the optical signals have been transmitted, and provide output indicative of the signal strength and the property to a microprocessor. The microprocessor is programmed to calculate the direction to the radiation source relative to the vehicle, and to provide this information to a vehicle guidance and control system.

47 Claims, 5 Drawing Sheets

FIBER OPTIC GUIDANCE SYSTEM FOR LASER GUIDED MISSILES

CROSS REFERENCE TO RELATED APPLICATIONS

Not Applicable

STATEMENT ON FEDERALLY SPONSORED RESEARCH OR DEVELOPMENT

Not Applicable

BACKGROUND OF THE INVENTION

1. Field of the Invention

The field of the invention relates to devices for determining the direction of a target radiating electromagnetic radiation for providing information to guidance systems for vehicles, such as missiles. The invention relates to a new and improved fiber optic guidance system for laser guided vehicles, such as guided missiles. These vehicles include target tracking functions performed on board the vehicle, based upon inputs from optical fibers distributed at various locations on the vehicle. A plurality of the optical fibers receive and transmit to a photodiode detector intermittent light energy radiating from a source of light energy. A plurality of the optical fibers receive individual source signals from the source and transmit them to the detector, which provides input to a microprocessor which determines the elevational and azimuthal direction to the light source to a high degree of accuracy, and provides such information to a flight control system. A method for utilizing the system is disclosed.

2. Description of the Prior Art

The use of optical fibers for transmitting tracking information is known, but often has been applied to transmission of such information rather than collection thereof. For example, U.S. Pat. No. 4,952,042, issued Aug. 28, 1990 to Pinson and assigned to The Boeing Company, discloses the use of optical fibers for transmitting information obtained by a telescope mounted on a gimbal in the forward end of a missile to a camera mounted further back in the missile. Similarly, U.S. Pat. No. 5,052,635, issued Oct. 1, 1991, to Paulet and assigned to Thomson-CSF, discloses the use of optical fibers for transmitting remotely transmitted missile guidance information from a sensor on an unpropelled aerodynamic carrier connected to the body of the missile by a flexible link.

U.S. Pat. No. 4,923,276, issued May 8, 1990, to Wells and assigned to Teledyne Industries, Inc., discloses a fiber optic telescope including an optical train having a plurality of tapered optical fibers arranged in a plurality of cascading stages. Wells' optical fibers concentrate and magnify the incoming light waves by both their tapered form and the cascading stages. Wells requires a large number of tapered optical fibers to be combined in a concentrating relationship to amplify the signal received for use in obtaining information on location of the source of light upon which it is trained.

The use of optical target detectors utilizing laser light is disclosed in U.S. Pat. No. 5,014,621, issued May 14, 1991 to Fox, et al. and assigned to Motorola, Inc. This patent utilizes a star coupler to automatically align pencil laser beams upon a target, and to track the target based on reflections of the laser light.

The use of missile referenced beamrider guidance links is disclosed in U.S. Pat. No. 4,696,441, issued Sep. 29, 1987 to Jones, et al. and assigned to the United States of America. Jones et al. discloses a laser beam in which the strength of the beam is formed into a gaussian cross section, the beam is directed upon a target at short range, detectors on an in-flight missile detect and measure the strength of the laser beam, and a guidance system guides the missile along the beam by adjusting the guidance controls to maximize the detected strength of the beam. The Jones et al. missile includes at least one laser detector mounted outside the central longitudinal axis of the missile and requires a reference beam.

A detector device for detecting the presence and originating direction of laser radiation is disclosed in U.S. Pat. No. 4,825,063, issued Apr. 25, 1989 to Halldorsson et al. and assigned to Messerschmitt-Bölkow-Blohm GmbH. The Halldorsson device includes a plurality of discrete light collection optics, each discrete optic being capable of gathering laser radiation over a certain solid angle, which overlaps the solid angle of its neighbors. The discrete optics are mounted together in a head, regularly arranged in azimuth aligned planes and elevation aligned planes. In Halldorsson's device, first, second and third wave guides are coupled to each discrete optic, with all first wave guides having identical lengths, shorter than the second and third wave guides. The lengths of the second and third wave guides are of increasing length in the direction of increasing azimuth and elevation angle, respectively, in order to form different transit times. In Halldorsson's device, first, second and third detector stages have opto-electrical transducers and are coupled respectively to the first, second and third wave guides. Transit time measuring circuits are coupled to the first, second and third detector stages which determine, respectively, the total time between detection by the first detector stage and the second and third detector stages. Based upon the times of arrival, the azimuth angle and the elevation angle of the incident laser radiation is determined. Halldorsson's system is limited by its use of discrete optics, a high speed counter for measuring time, and its use of a head for mounting its plurality of neatly aligned azimuth and elevation planes of identical discrete optics. Halldorsson's degree of accuracy is limited by the measurement only of transit time differences.

None of the systems disclosed in these prior art patents provide the features disclosed in the following specification.

BRIEF SUMMARY OF THE INVENTION

An object of the invention is to provide directional information to a vehicle guidance system, in which optical fibers are used to both collect and transmit optical signals for use in an on-board vehicle guidance and flight control system, in which the vehicle is intended to home in on its target. The present invention uses optical fibers which require no separate collection optics, but instead directly collect incident radiation arriving at one end of the optical fiber. Preferably the radiation is laser radiation received from a target in relation to which or towards which the vehicle is guided. Elimination of collection optics reduces the complexity and cost of the apparatus and provides an unexpected increase in and selectability of the accuracy of directional determination by the system and the method.

A further object of the invention is to provide a vehicle guidance system and method of using the system in which the optical fibers may be distributed at selected locations on the vehicle, in order to provide a distributed array of apertures for directionally selecting and collecting incoming laser information. Due to the ability of the optical fibers to collect light with no need for a separate light-gathering device, the fibers may be distributed on various parts of the vehicle with much less regard to the incremental cost of each additional collection point. This feature eliminates the need for a closely packed, regular array of identical optical collection devices mounted as a unit, as known in the prior art. This feature allows the vehicle guidance system to be designed to have a preselected degree of accuracy in any preselected orientation relative to the vehicle's line of travel, thereby maximizing targeting accuracy while minimizing additional expense resulting from the number of light collection points.

A further object of the invention is to provide a vehicle guidance system in which the optical fibers may be oriented so as to collect incident radiation from any preselected direction, e.g., fore, aft, sideways and vertically, and any desired combination of directions. This feature allows the guidance system to detect targets in locations at widely varying orientations relative to the direction of travel of the vehicle.

A further object of the invention is to provide a vehicle guidance system in which the number of fibers arrayed in the same general direction, such as fore or aft, may be selected to provide the desired degree of accuracy in determining the target direction.

A further object of the invention is to provide a vehicle guidance system in which each optical fiber has a preselected fiber numerical aperture and a corresponding substantially conical field of view. The field of view may be preselected for a given fiber, adding further control to the selection of the degree of accuracy in determining the target direction. Selection of numerical aperture, combined with elimination of collection optics provides unexpected benefits in increased accuracy of directional determination by the system.

A further object of the invention is to provide a vehicle guidance system in which the degree of accuracy in any preselected direction can be selected based upon combining the above-identified parameters as required for directional accuracy. Thus, the number of fibers arrayed in the same general direction, the fiber numerical aperture, the direction in which the fiber is oriented in the array of apertures, and the degree of overlap of the field of view with the fields of view of all the fibers expected to receive the same source signal may be variably selected to provide the maximum necessary resolution and accuracy in determining the target direction. Thus, for example, in the forward direction, relative to the direction of movement of the vehicle, the target direction or position may preferably be determined to a high degree of accuracy, while in other directions the direction or position need be determined to a lower degree of accuracy. The lower degree of accuracy is acceptable in directions other than directly towards the target, because if a vehicle is grossly off course, it first needs gross adjustments in its line of travel so as to proceed more directly toward the target, and only when the vehicle's direction of travel has been corrected to a course more directly toward its target does it need to increase the accuracy of its line of travel by utilizing more accurate information to make small adjustments in direction of travel. Precise measurement of such characteristics provide sufficient information to enable the present system to obtain accuracies as high as in the range of 1–2% in determination of any pre-selected direction relative to the axis and line of travel of the missile.

These and other features of the present invention will be more apparent from the following detailed description.

BRIEF DESCRIPTION OF THE SEVERAL VIEWS OF THE DRAWINGS

FIGS. 4 and 4a show a schematic, magnified sectional view of the light receiving end of an optical fiber in accordance with the invention, including a representation of the path light rays might take through the fiber, depending on the angle of incidence of the light ray relative to the longitudinal axis of the fiber.

DETAILED DESCRIPTION OF THE INVENTION

With reference now to the drawings, FIGS. 1 to 7, a new and improved fiber optic guidance system of particular utility for a laser guided missile will be described. While the present invention is described in terms of its most preferred embodiment as a laser guided missile guidance and control system, it is to be understood that the invention is not so limited, being applicable to any vehicular guidance and control system which receives radiation from a source or target for purposes of determining the location of the source or target. In the missile example, the electromagnetic radiation obtained is laser light, as is known in the art. It is to be understood that other substantially monochromatic radiation could be employed. In the missile example, the laser light detected by the guidance system has been reflected from the target towards which the missile is being guided. It is to be understood that the laser or other substantially monochromatic radiation may be generated at or by the target, rather than being reflected from the target. The vehicle described herein preferably is a homing type vehicle which may be a military guided missile, a ground operating vehicle, or some other mobile system, such as a boat or a robot. In alternative embodiments, the target may include a remotely activated light source, toward which the vehicle may be guided. In other embodiments, the source signal may be light emitted by a light emitting diode. The vehicle includes a propulsion, guidance and directional control system, for use with the invention described below, all for directing the vehicle to the target. Further, it is most preferred that the light source be capable of firing rapid on/off or intermittent bursts, as with known laser targeting systems. The wavelengths of light useful in the invention range from the ultraviolet to the far infrared, and are preferably those wavelengths transmitted through the atmosphere with minimum interference by the normal components of the atmosphere.

Figure 1:
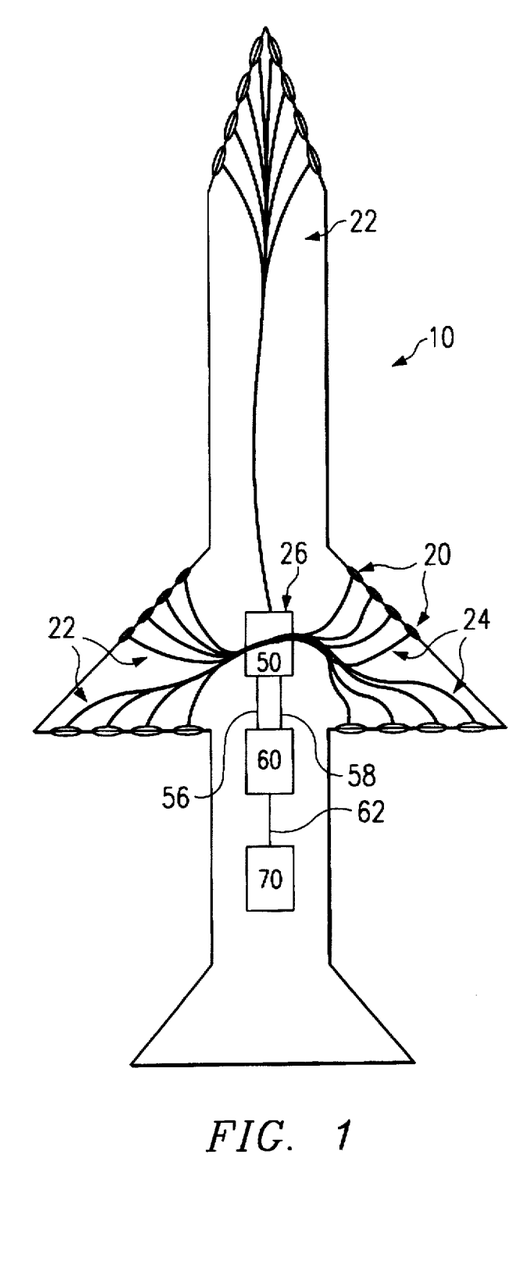
FIG. 1 is a schematic plan view of a missile, including a plurality of exemplary locations for light-receiving apertures each containing optical fibers, distributed on leading and tailing edges of the fins or wings, and on the nose of the missile thereof, in accordance with the invention.
Figure 1A:
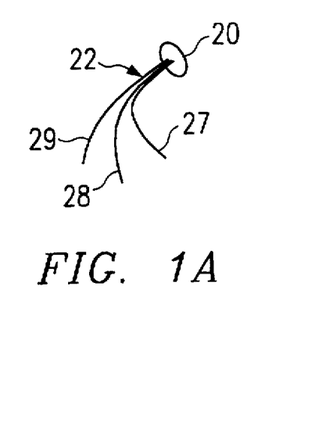

FIG. 1 is a schematic plan view of a vehicle, such as a missile 10, incorporating an array of apertures 20 each containing one set of a plurality of sets of optical fibers 22. At each aperture is disposed at least one start fiber and at least one stop fiber, or a single fiber which is subsequently split into at least one start fiber and at least one stop fiber. Preferably, as shown in FIG. 1A, each aperture 20 contains a set of fibers 22 consisting of three, or multiples of three, collinearly disposed fibers 27, 28 and 29, as described in more detail below. For simplicity, in the figures other than FIG. 1A, the drawing element depicted as "fiber" 22 is actually a set of three fibers, designated by reference number 22. The first of these three fibers is a start fiber 27, the second is an azimuthal stop fiber 28, and the third is an elevational stop fiber 29. The number of fibers in a set of fibers may be any integral multiple of three fibers, the number variable as needed to obtain adequate signal strength. A light receiving, or proximal, end 24 of each fiber in a set of three or multiples of three fibers is disposed at an individual aperture 20. The light receiving end 24 for a set of three fibers may be a single fiber which is split by a fiber splitter into the three fibers of a set of fibers 22.

Figure 2:
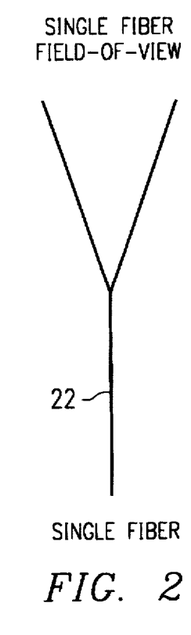
FIG. 2 is a schematic view of a single optical fiber together with a representation of its field of view in accordance with the invention.
Figure 3:
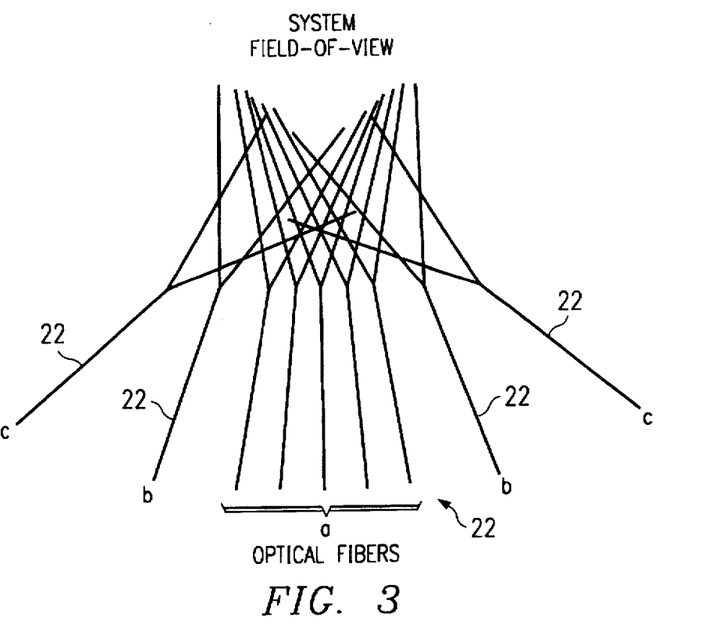
FIG. 3 is a schematic view of a group of arrayed optical fibers all having approximately the same field of view, showing how the fields of view of the arrayed fibers overlap, in accordance with the invention.
Figure 5:
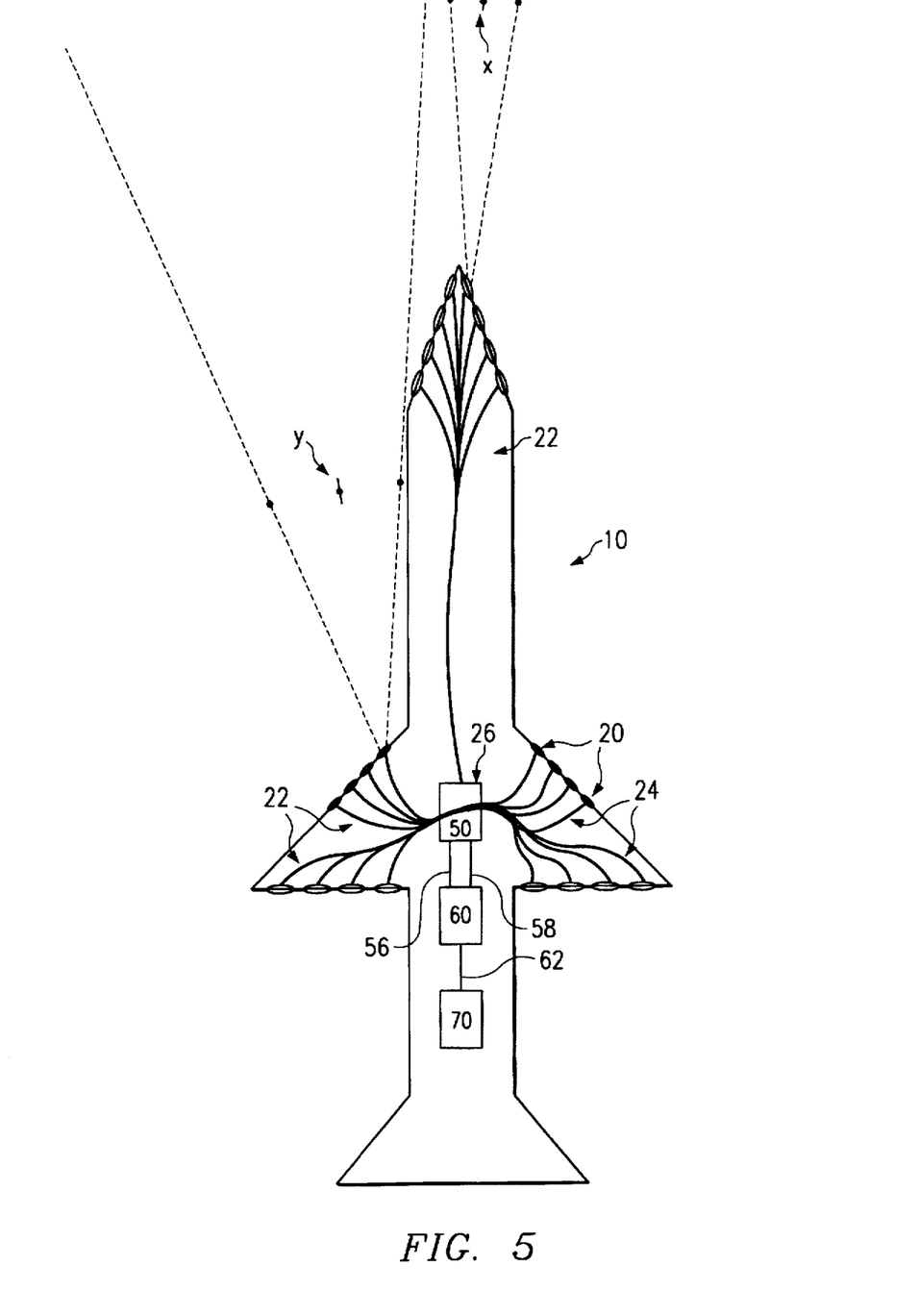
FIG. 5 is a schematic plan view similar to FIG. 1, but including a representation of a possible fields of view for each of two of the individual optical fibers, each arrayed in its aperture.
Figure 6:
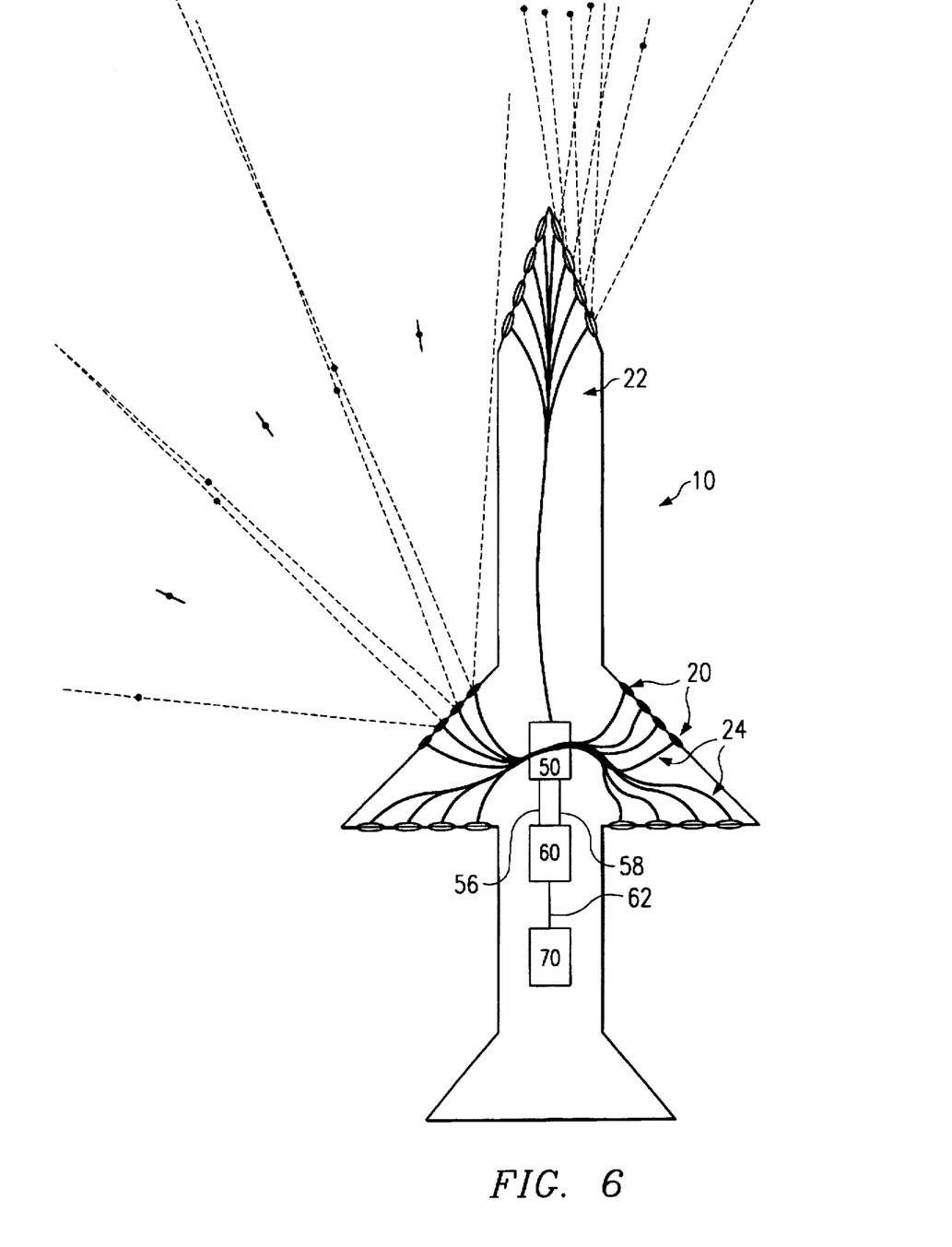
FIG. 6 is a schematic plan view similar to FIG. 1, but including a representation of a possible selection of fields of view for the individual optical fibers arrayed in each of the plurality of apertures.

As shown in FIG. 1, the set of optical fibers 22 in its aperture 20 may be arrayed along the leading or trailing edge of the flight control panels (e.g., wings or fins), near the nose, or in any other selected location on the missile 10. In addition to providing selectable locations for each set of optical fibers 22, as best shown in FIGS. 2 and 3, the present invention allows the field of view of each set of fibers 22 to be selectably controlled, by variation of the numerical aperture of the fiber. In addition to location, the elevational and azimuthal direction of the set of fibers 22, relative to that of the missile's line of travel, may be selected and adjusted. In addition to providing selectable locations and fields of view for each set of optical fibers 22, as best shown in FIGS. 5 and 6, the directional orientation of the field of view of each adjacent set of fibers 22 relative to that of its neighboring sets of fibers may be adjusted so that the fields of view overlap to a controllable and preselectable degree. This ability provides a great degree of selectability in the accuracy of determination of the position of an illuminated source or target. In addition to these variables, the present invention provides for selection of the density of adjacent sets of fibers oriented in the same general direction, depending on the desired accuracy of directional determination needed in that general direction. For example, as best shown in FIG. 6, in the case of a missile fired toward a laser-illuminated target, the greatest degree of accuracy would be needed in forward direction, with little accuracy required for other peripheral directions. The present invention allows such selectability through selection and combination of these parameters as needed to obtain the desired degree of accuracy in any given direction.

Figures 4A, 4B:
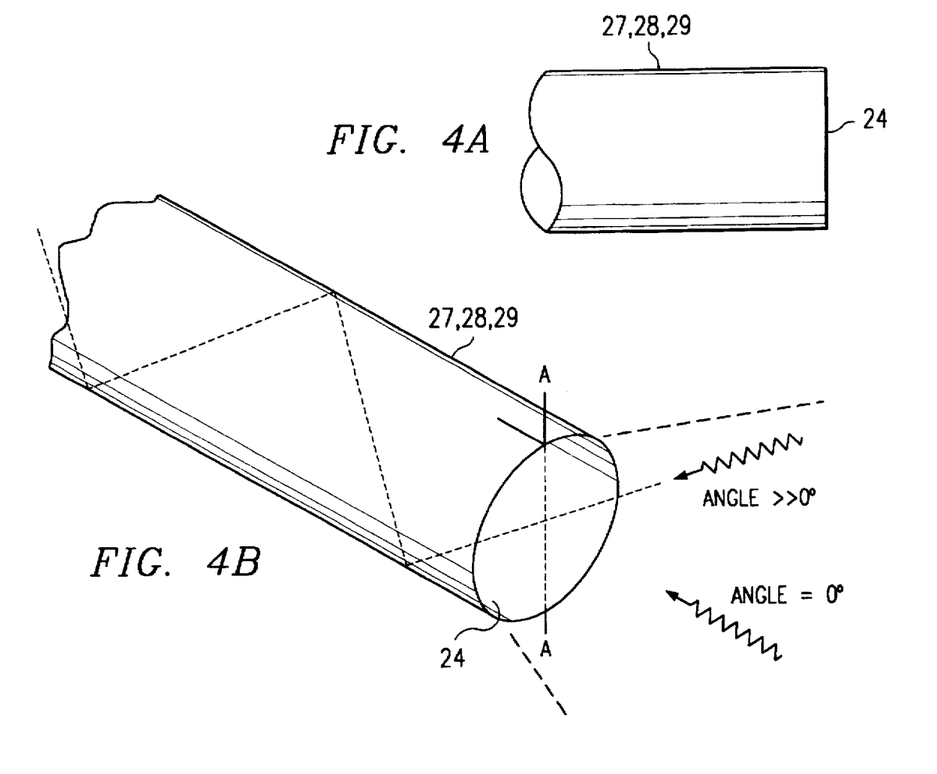

Referring again to FIG. 1, each of the plurality of individual optical fibers 27, 28, 29 includes the first, light receiving or proximal end 24, and a second, detector-attached, distal end 26. The distal end 26 is interfaced with a detector unit 50. The proximal light receiving end 24 functions to allow light to enter the fiber without the need for additional light gathering optical devices. Preferably, the light receiving end 24 has a flat, polished end, as best shown in FIG. 4A, and it is the incoming radiation that strikes this surface which provides the input to the detector 50 and thence the guidance and control system of the present invention. The field of view of each individual fiber 27, 28, 29 is determined primarily by its fiber numerical aperture.

As best shown in FIGS. 1, 4 and 4A, neither the apertures 20 nor the individual fibers include any light gathering apparatus to assist the light-receiving function of the proximal end 24. Thus, the aperture 20 is essentially an opening or passageway exposing the end 24 of the individual fiber to radiation arriving at the aperture 20. The aperture 20 may include a transparent protective material which acts to protect the fiber from substances or conditions such as heat or cold, but any such protective material does not participate in light gathering. As described below, the aperture may contain a single fiber end, which subsequently is split into three fibers, or it may contain three separate, discrete fibers, or multiples of three. Preferably each individual optical fiber 27, 28, 29 remains as a separate, individual fiber for its entire length. When multiples are used the same number of start, azimuth stop and elevation stop fibers are used. The range of integral multiples of the three types of fibers which might be used is limited only by the size of the aperture required to allow each fiber to receive the incoming radiation. Practically, the range of multiples may be considered to be between 2 and 100. Thus, a set of fibers may practically include 3, 6, 9, 12, 15 . . . 300 fibers. Preferably, each aperture is linked, via the set of optical fibers 22, to three individual detectors via the distal fiber ends 26. The three individual detectors, to be described below, are preferably contained within the detector unit 50 shown in FIGS. 1, 5 and 6. Preferably if multiples of three fibers are used in the set, the same multiple of each fiber arrives at each detector.

Each fiber is preferably made from standard clad optical fiber material typically having a diameter of approximately 125 microns or 300 microns. These diameters are exemplary only, and various other diameters may be used, as will be understood by those in the art.

As described above, each set of fibers 22 includes the start fiber 27, the azimuthal stop fiber 28, and the elevation stop fiber 29. Most preferably, all start fibers 27 have the same length, that length being shorter than or equal to the length of the shortest of the azimuth or elevation fibers. The azimuth stop fibers 28 may be considered to be arranged in elevational rows, and elevational stop fibers 29 may be considered to be arranged in azimuthal columns. However, unlike in the prior art, the rows and columns are not neatly aligned together in a head, but are located in selected, dispersed locations on the vehicle. Each row or group of azimuth stop fibers 28 has a unique length, which is equal to or greater than the length of the start fibers 27. Likewise, each column or group of elevation stop fibers 29 has a unique length, which is equal to or greater than the length of the start fiber 27. The length of each azimuth and elevation stop fiber is known, as is the time required for an optical signal to traverse the length of each such fiber, and this information is stored for use by a microprocessor 70 in calculating and interpolating the direction to the source relative to the vehicle.

Figure 7A:
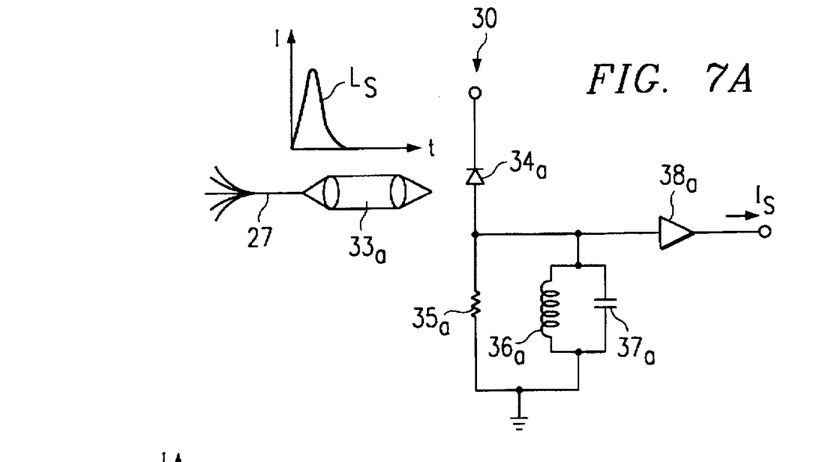
FIGS. 7A, 7B and 7C are schematic wiring diagrams for the start, azimuth stop and elevation stop detectors, and include schematic waveform diagrams of incoming optical signals vs. time.
Figure 7B:
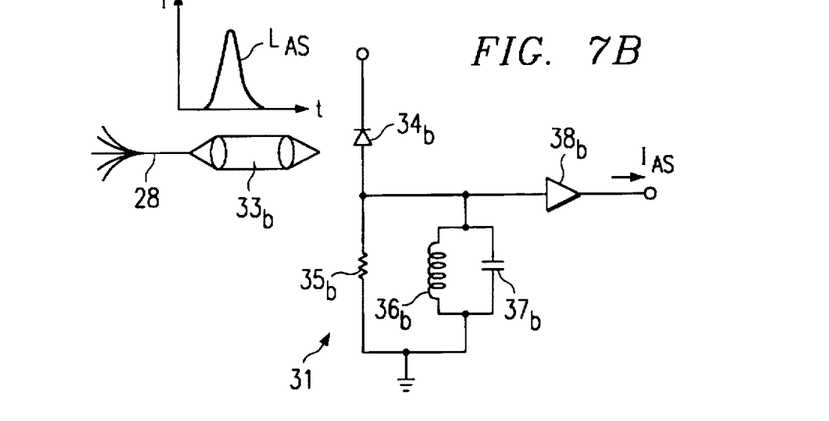
Figure 7C:
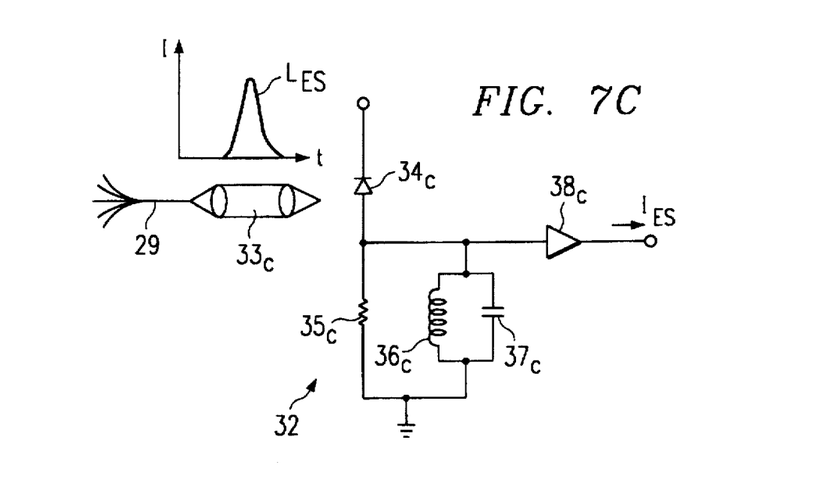

Each fiber in the set of fibers 22, i.e., the start fiber 27, the azimuth stop fiber 28, and the elevation stop fiber 29, is attached at its distal end to its individual detector. The three individual detectors are designated, respectively, a start detector 30, an azimuthal stop detector 31, and an elevational stop detector 32. Thus, all start fibers from all apertures lead to the start detector 30. All azimuth fibers from all apertures lead to the azimuthal stop detector 31. All elevation fibers from all apertures lead to the elevational stop detector 32. The detectors are shown in FIGS. 7A, 7B and 7C, and are described in more detail below.

The individual detectors 30, 31, and 32 are arranged in the detector unit 50. The output from each of these detectors is delivered to a difference measuring unit 60. The individual detectors measure a property related to the length of the fiber through which the optical signals have been transmitted, and the signal strength of the optical signals, for each optical signal arriving at the respective individual detector. The difference measuring unit 60 measures the difference between the property related to the length of the fiber for each detector. In other words, the difference measuring unit 60 measures the difference in the property between signals arriving at the start detector and the azimuthal stop detector, and measures the difference in the property between signals arriving at the start detector and the elevation stop detector. These differences, together with information on the strength of the signal from the individual detectors, are output to the microprocessor 70 for analysis with stored information such as the actual length and position of the fibers 22, and thence determination of the direction relative to the vehicle to the source of the radiation detected.

Referring now to FIG. 2, each fiber 22 has a characteristic field of view as schematically shown in FIG. 2. The field of view of a fiber depends primarily upon its numerical aperture. The numerical aperture acts to weaken and block incoming light rays or source signals emanating from an illuminated source, with the degree of weakening increasing until the signal is effectively blocked at an angle that exceeds the angle defined by the field of view associated with the numerical aperture. It is understood that while FIG. 2 illustrates the field of view in only two dimensions, the actual field of view of the fiber 22 is conical, in three dimensions. Whenever this specification refers to a field of view, the actual field is a three dimensional cone, with the apex of the cone at the first end 24 of the fiber 22. Light reaching the first end 24 from within the cone is within the field of view of the fiber.

Referring now to FIG. 3, a plurality of optical fibers is shown arrayed to provide varying degrees of overlap of the fields of view of the individual fibers. In FIG. 3, all the fibers have substantially the same field of view, but this is not necessarily or preferably the case. The field of view, of the various fibers in the arrayed plurality of fibers may be selected to provide the degree of accuracy in determination of target direction required for a given direction relative to the vehicle. In other words, the accuracy in a given direction may be controlled by selection of, inter alia, the field of view of the fibers pointing in that direction, and by selection of the degree of overlap of adjacent fields of view. As suggested by the positions and orientations of the fibers, the five fibers near the center of the array, designated as the "a" group in FIG. 3, will provide the highest accuracy in determining of the position of or direction to a target near the center of their field of view. The next outwardly positioned two fibers, designated as the "b" group in FIG. 3, are both oriented in a different direction and overlap to a different degree with the adjacent fibers than do the fibers in the "a" group. These "b" group fibers provide a lower accuracy than do the "a" group fibers. Finally, the next outwardly positioned two fibers, designated as the "c" group, are oriented in yet another direction, and have fields of view with less overlap with adjacent fibers in groups "a" and "b." The "c" group fibers provide less accuracy than the "b" group fibers. Note that the numerical aperture of these groups of fibers may be selected so as to increase or decrease the available field of view of any of the fibers shown in FIG. 3. Likewise, additional fibers may be added, the fibers may be provided with other orientations, fields of view, and degrees of overlap with adjacent fiber fields of view, resulting in directionally selectable accuracies, in accordance with the selected parameters.

Referring now to FIG. 4, a schematic drawing is shown of the light-receiving end 24 of the fiber 22. As is shown in FIG. 4A, preferably the end of the fiber is flat, and most preferably has been polished to a high degree so as to avoid distortion or loss of entering optical signals. As used in this disclosure, the angle of incidence of incoming radiation is defined as the angle formed between the direction of propagation of the radiation and the central longitudinal axis of the fiber at or near the end of the fiber. It is well known to those in the art of fiber optics that the more interaction an optical signal traveling in a fiber has with the walls of the fiber, the more the strength of the optical signal is attenuated. As is most clearly shown in FIG. 4, the optical fibers of the present invention preferably do not include any separate light-gathering apparatus on the light-receiving end 24 of the fiber 22. As is shown in FIG. 4, an optical signal entering the fiber at an angle of incidence at or close to zero degrees will travel through the fiber with a minimum of interaction with the walls of the fiber and with a minimum of attenuation due to the effect of the refractive index of the optical fiber, and so will be attenuated very little by the passage. Also shown in FIG. 4, an optical signal entering the fiber at an angle of incidence substantially greater than zero degrees will undergo many interactions with the wall of the fiber and will be significantly affected by the refractive index of the optical fiber, and so will be attenuated to a greater degree than optical signals entering at angles closer to zero degrees from the longitudinal axis of the fiber. The relation between angle of incidence and attenuation for a given optical fiber at a given wavelength of light should be constant and so can be stored in memory for use by the microprocessor 70.

The radiation incident upon the end 24 of the fiber 22 will be further attenuated to a small but finite degree as a result of reflection of the incident radiation from the outer surface of end 24. The degree of attenuation due to reflection will vary with the angle of incidence, and other factors known to those in the arts. Such attenuation should also be constant for a given fiber at a given wavelength and so provides further information to the microprocessor in accurately determining the direction to the source.

As FIGS. 4 and 4A suggest, for radiation incident upon the end 24 of the fiber 22, the strength of the optical signal initially entering the fiber 22 will be affected by the angle of incidence of the arriving radiation for another reason. If the radiation arrives at an angle of 0°, as shown in FIG. 4, the end 24 of the fiber 22 appears to form a round disc if the fiber is round. Thus the "target," into which the radiation must enter to form an optical signal in the fiber, appears as a circle. By contrast, when radiation of the same wavelength arrives at the same end 24 of the fiber except at an angle substantially greater than zero degrees (0°), as also shown in FIG. 4, less of the incoming radiation can enter the end 24 of the fiber 22, simply because the "target" from this angle forms an ellipse having an apparent area smaller than a circle. The width of the ellipse becomes smaller with increasing angle of incidence. Thus, simply because the "target" is smaller, and less radiation will enter the fiber. This effect is in addition to the effect of the refractive index and other physical variables such as reflection which contribute to the attenuation of the signal indexed by the numerical aperture.

As a result of these attenuation effects arising from and related to the angle of incidence, optical signals arriving at the detector will have a signal strength related to the angle of incidence. The exact relationship between angle of incidence and attenuation will vary depending on the material from which the optical fiber is made and on the wavelength of the incoming radiation, but should be reproducible for a particular fiber and laser combination, and storable in memory for use by the microprocessor in more accurately determining the directional relationship between the vehicle and the radiating target.

FIG. 5 shows a missile such as that shown in FIG. 1, schematically showing the field of view (again as a two dimensional triangle instead of the actual three dimensional cone) for two fibers having different fields of view resulting from different numerical apertures and different directional orientations relative to the missile. FIG. 5 shows a first fiber deployed on the nose of the missile, in an area which might require maximum accuracy of directional determination, which has a small numerical aperture and a small cone, of approximately 15° width. Point x identifies the central axis of the cone which is collinear with the longitudinal axis of the optical fiber, and in this position is directed very close to the longitudinal axis of the missile.

FIG. 5 shows a second set of fibers, deployed on the wing or fin of the missile, in an area which might require less accuracy of directional determination than that of the first set of fibers. This second set of fibers has a slightly larger numerical aperture and a slightly larger cone, of approximately 30° width. Point y identifies the central axis of the cone which is collinear with the longitudinal axis of the optical fiber, and as shown in this position is directed outwardly from the longitudinal axis of the missile. From this orientation, this fiber provides less accuracy than would the first fiber.

FIG. 6 schematically shows a missile such as in FIG. 5, with fields of view shown for additional fibers. Of the fibers arrayed on the nose of the missile, the first three fibers are shown to have substantially the same field of view, approximately 15° width, while the fourth fiber, furthest from the nose of the missile, has a wider field of view, approximately of approximately 30° width. The fields of view of all four of these fibers overlap substantially. These fibers attain maximum accuracy in the determination of the direction to the source or target substantially directly in the line of travel, along the longitudinal axis of the missile 10, for input to the detector unit 50 and subsequently to the microprocessor 70 of the laser guidance system.

FIG. 6 also shows three fibers arrayed on the wing or fin of the missile. Of the fibers so arrayed, the first two have the same field of view, the field having a width of approximately 30°, while the third fiber of this group has a wider field of view, the field having a width of approximately 45°. The fields of view of these wing or fin-arrayed fibers overlap much less than do the fields of view of the nose-arrayed fibers. Less overlap, combined with a wider field of view, combine to yield a significantly lower degree of accuracy in determining the directional orientation of a source or target detected by these fibers. However, as mentioned above, less accuracy is required in this direction, since if the vehicle or missile is sufficiently far off course that these detectors see the source or target, then gross corrections need to be made to the course of the vehicle or missile, before more accurate determinations are useful.

In previously known laser detection systems, such as that of Halldorsson et al., U.S. Pat. No. 4,825,063, described above and incorporated herein by reference, the azimuthal and elevational apertures were disclosed to be mounted in a head or similar arrangement, in which the azimuthal apertures were arranged in compact, straight rows, and the elevational apertures likewise were arranged in compact, straight columns, arranged perpendicularly to the azimuthal aperture rows. In the present invention, the apertures are distributed in small groups on various surfaces of the vehicle, with the several apertures defining an azimuthal row or an elevational column arranged in widely dispersed positions about the vehicle.

In one particularly preferred embodiment, a missile which comprises four fins or wings, similar to that shown in plan view in FIG. 1, includes four apertures along the leading edge of each fin. The apertures are directed and the numerical apertures of the fibers are selected to provide a total field of view of 90° in the azimuthal plane and 90° in the elevational plane, on each of the four fins. Since there are four such fins, and each accounts for an elevational field of view of 90°, a total field of view of 360° is provided in the elevational plane. Thus, each fin of the missile can be identical, enabling a significant reduction in manufacturing costs. The apertures on the fins are preferably provided with less accurate but wider field of view fibers, with little overlap between adjacent fields of view. On each fin, the fibers at each aperture having a common azimuthal or elevational plane have the same length. Thus, the four apertures on the four fins constitute a 4-by-4 array of azimuthal and elevational planes. The signals arriving from these apertures provide the data from which the microprocessor calculates and interpolates the direction to the target or source of the detected radiation.

In contrast to the relatively low accuracy of the fin-mounted fibers, fibers mounted on the nose of the missile would provide very highly accurate determinations of the exact location of and direction to the missile's target. An array of apertures mounted near the nose of the missile would have a narrow field of view and significant overlap between fields of view of adjacent fibers, and the fibers all would be oriented in front of the missile. These fibers would be attached to the same detectors as the fibers originating on the fins, and would have lengths commensurate with the azimuthal and elevational planes on which they are mounted. The nose-mounted fibers would provide more data, thereby allowing the microprocessor to more accurately determine directions. Thus, the array of apertures of the present invention provides significant improvement over the prior art, both in terms of increased accuracy, increased selectability of accuracy relative to the direction of flight of the missile, decreased manufacturing cost, and simplicity of construction.

When a burst of radiation from a source, referred to as the source signal, arrives at the vehicle, only some of the apertures in the array of apertures 20 will "see" the incoming radiation, since the array of apertures 20 is directed outwardly in a plurality of directions. The group of apertures which "sees" the radiation may be referred to as a subarray. The radiation simultaneously enters each aperture 20 of the subarray, thence into the proximal, light receiving end 24 of each individual fiber 27, 28, 29 in each such aperture. The proximal end 24 of each individual fiber in the subarray receives the source signal radiation essentially simultaneously. The optical signal generated from the incoming radiation in each fiber 27, 28, 29 propagates down the length of that fiber. Thus, each optical signal begins its journey down all the fibers 27, 28, 29 at the same time as every other optical signal resulting from arrival of the radiation from the source. This is so for start, azimuth stop and elevation stop fibers.

Due to the simultaneous arrival of the radiation and the identical length of all start fibers 27, the optical signals propagating down each start fiber 27 reach the start detector simultaneously. The arrival and detection of these optical signals provides the "start" time and phase position information and a reference signal strength value. This data will be used by the microprocessor in calculating and interpolating the direction to the source from the vehicle.

Due to the unique lengths of each group of azimuth fibers 28 and each group of elevation fibers 29, the optical signal transmitted by each group of azimuth and elevation stop fibers is received and detected by its respective detector at a slightly different, unique time. The time is directly related to the length of the fibers in the group, and serves to identify the aperture row or column from which the optical signals originated. Thus, although the radiation arriving at all the proximal fiber ends 24 was originally coherent, the fact that each optical signal arrives at the respective azimuth stop and elevation stop detectors 31.32 at a slightly different time creates the appearance of a loss of coherence in the signals arriving at the distal or detector ends 26 of the fibers. This loss of coherence appears and can be measured as a difference in the phase of the light wave of each optical signal, which appears slightly shifted relative to the phase of optical signals arriving at the respective detector from other fibers. The phase difference is preferably determined by a phase comparator chip in the difference measuring unit 60, shown in FIGS. 1, 5 and 6. Such a chip is much smaller and less expensive than the prior art timing device. This apparent difference in phase can be used to determine the time of arrival as a means of identifying the source aperture. Since the length of each fiber attached to each aperture, and therefore the phase shift and transit time, is known, the aperture can be identified. Thus, the property related to the length of the fiber over which the optical signal was transmitted is preferably the phase of the optical signal. In the prior art, the property related to the length of the fiber over which the optical signals were transmitted was the time at which the respective signals emerging from the detector circuit crossed the zero point. The zero crossing was used as a start and stop signal for a high speed timing device. In the presently preferred embodiment, the signals emerging from the detector circuit are directly fed into a phase comparator, which compares and measures the difference in phase between the signals, making the phase of the optical signals the property of interest.

The phase comparator chip is superior to the zero-crossing/timer device for measuring the difference between the optical signals arriving at the detector. As discussed above, the phase comparator measures the difference between the phase properties of the start and stop signals by means of a phase comparator chip. Such a chip may be an 8 bit, 16 bit, 24 bit, 32 bit, or higher bit number digitizer. Increasing the number of bits increases the accuracy of the phase measurement without substantially increasing the power demand of the phase comparator chip.

In contrast, the zero-crossing/timer device can increase its accuracy primarily only by employing a faster timer, which produces more counts in a given period. However, the power demand of a faster timer increases much more quickly that the increase in accuracy obtained as a result. Thus, in the zero-crossing/timer device, an increase in accuracy is much more costly than in the phase comparator, providing another advantage of the present invention.

The strength of the optical signal received at the detector provides further information as to the angle of arrival of the incoming radiation at the aperture, which indicates direction to the source of the radiation. As described for FIGS. 4 and 4A, first the angle of arrival determines whether a fiber receives the signal at all. If the angle is outside the field of view of the fiber, as determined by its numerical aperture, no optical signal will be generated. Second, the angle within the field of view causes attenuation of the signal due to reflection and refraction of the incoming radiation. The quantum of these effects in relation to the fiber is a characteristic of such factors as the numerical aperture of the fiber, the diameter of the fiber, the angle of arrival, the wavelength of the incoming radiation, and the smoothness of the surface of the proximal end 24 of the fiber 27, 28, 29. These characteristics are stored for use by the microprocessor, and are used to determine the angle of arrival, relative to the directional orientation of the aperture, of the incoming radiation.

The simple relationships between (a) transit time and aperture, and (b) signal strength and angle of arrival, might be used on a fiber-by-fiber basis to identify the aperture and obtain some information about the angle from which the signal arrived, if each signal of interest arrived at only a single aperture. In fact, the radiation signal arrives at a plurality of apertures simultaneously. This fact allows the present vehicle guidance system to accurately and rapidly identify by a process of interpolation the direction to the source of radiation relative to the vehicle's line of travel, and to provide this information to a guidance and control system for controlling movement of the vehicle with respect to the source. The following description provides disclosure of that operation.

Each detector functions in the same way, so that a general description of one will serve to describe the operation of the start, azimuth stop, and elevation stop detectors.

All of the start fibers 27 are of identical length and are led in a bundle onto a start detector device 30.

The azimuth stop fibers 28 are formed into elevation planes and are bundled and led to a second detector, the azimuth stop detector 31. The fibers from each elevation plane are of identical length and are perpendicular to the azimuth planes. Although the fibers from each elevation plane are equal in length to each other, in each successive elevation plane they are longer than those fibers which comprised the preceding elevation plane. The length of all the azimuth stop fibers are longer than the start fibers.

All of the elevation stop fibers 29 are formed into azimuth planes and are bundled and led to a third detector, the elevation stop detector 32. The fibers from each azimuth plane are of identical length and are perpendicular to the elevation planes. Although the fibers from each azimuth plane are equal in length to each other, in each successive azimuth plane they are longer than those fibers which comprised the preceding azimuth plane. The length of all the elevation stop fibers are longer than the start fibers.

As seen in FIG. 7A, the start fibers are guided to imaging optics 33a which images the front-face ends of these wave guides on a photo diode 34a, which is part of the start detector 30. The photo diode 34a is coupled in series with a damped resonant circuit comprised of a resistor 35a, coil 36a, and capacitor 37a. Additionally diode 34a and filter circuit 35a, 36a and 37a are coupled to an amplifier 38a at the output of which amplifier current $I_S$ flows. When a laser pulse impinges on the first, receiving end 24 of a group of start fibers in their apertures, an optical signal is transmitted over the start optical fibers receiving the signal. This pulse has the current response over time as shown in FIG. 7A and labeled $L_S$. The damped resonant circuit has a ringing frequency which matches the wavelength of the incoming radiation. The damped resonant circuit output is a signal having a wavelength and phase in accordance with that of the laser radiation striking the photo diode. This output constitutes a first, start input to a circuit for determining the time of arrival of incoming radiation.

In the preferred embodiment, the device comparing the start and each of the stop signals is a phase comparator chip. This output $I_S$ from the start damped oscillation circuit 35a, 36a and 37a constitutes one input leg to each of the comparators.

In FIG. 7B the azimuth stop fibers 28 are guided to imaging optics 33b which images the front-face ends of these wave guides on a photo diode 34b, which is part of the azimuth stop detector 31. The photo diode 34b is coupled in series with a damped resonant circuit comprised of a resistor 35b, coil 36b, and capacitor 37b. Additionally diode 34b and filter circuit 35b, 36b and 37b are coupled to an amplifier 38b at the output of which amplifier current $I_{AS}$ flows. When a laser pulse impinges on the first, receiving end 24 of a group of azimuth stop fibers in their apertures, an optical signal is transmitted over the azimuth stop optical fibers receiving the signal. This pulse has the current response over time as shown in FIG. 7B and labeled $L_{AS}$. The damped resonant circuit has a ringing frequency which matches the wavelength of the incoming radiation. The damped resonant circuit output is a signal having a wavelength and phase in accordance with that of the laser radiation striking the photo diode. This output $I_{AS}$ constitutes an azimuth stop input to a comparator for determining the apparent phase difference and time of arrival of the azimuthal component of the incoming radiation.

In FIG. 7C the elevation stop fibers 29 are guided to imaging optics 33c which images the front-face ends of these wave guides on a photo diode 34c, which is part of the elevation stop detector 32. The photo diode 34c is coupled in series with a damped resonant circuit comprised of a resistor 35c, a coil 36c, and a capacitor 37c. Additionally diode 34c and filter circuit 35c, 36c and 37c are coupled to an amplifier 38c at the output of which amplifier current $I_{ES}$ flows. When a laser pulse impinges on the first, receiving end 24 of a group of elevation stop fibers in their apertures, an optical signal is transmitted over the elevation stop optical fibers receiving the signal. This pulse has the current response over time as shown in FIG. 7C and labeled $L_{ES}$. The damped resonant circuit has a ringing frequency which matches the wavelength of the incoming radiation. The damped resonant circuit output is a signal having a wavelength and phase in accordance with that of the laser radiation striking the photo diode. This output $I_{ES}$ constitutes an elevation stop input to a comparator for determining the apparent phase difference and time of arrival of the elevational component of the incoming radiation signal.

The damped ringing circuit has the same resonant frequency as that described for the start circuit. As can be seen in FIGS. 7B and 7C the longer length of optical fibers 28 and 29 delays the arrival of the laser pulse on the receiver optics 33b, 33c and consequently on the photodiodes 34b, 34c. The damped oscillation is consequently correspondingly delayed, and the signal produced from the damped circuit appears with a phase shift relative to that from the start detector. The difference between the phases of the start signal and each of the azimuth and elevation stop signals provide information on the azimuth angle and elevation angle of the incident radiation, and thus to the direction to the source of the radiation detected by the system.

As an alternative to the foregoing preferred method for measurement of the apparent phase difference between the start and the azimuth stop signals and between the start and the elevational stop signals, other differences between the signals could be measured. For example, as disclosed by Halldorsson, U.S. Pat. No. 4,825,063, which has been incorporated herein by reference, the output of the damped oscillating circuit 35, 36, 37 may be passed to a zero crossing detector and the difference between arrival times measured by a high speed counting device.

A method of operating the system described hereinabove may be described as follows. A method for determining the direction to a radiating source relative to a moving vehicle deploying the system and for providing information to a guidance system for the vehicle, by reference to an optical source signal received from the radiating source at a subarray of apertures, the array of apertures arrayed at selected positions on the vehicle comprises the steps of:

1. providing a plurality of start optical fibers, each start optical fiber having substantially the same length, each start fiber having a first, radiation receiving end and a second end coupled to a start detector;

2. providing a plurality of stop optical fibers, in which each stop fiber has a selected length equal to or greater than the length of the start fibers, each stop fiber has a first, radiation receiving end and a second end coupled to a stop detector, in which one start fiber and at least one stop fiber are coupled together to form a set of fibers, one set of fibers is disposed at each aperture, all the fibers in each set of fibers have the same selected numerical aperture and are directed in the same selected direction relative to the vehicle, and the first radiation receiving end of each set of fibers receives the optical source signal for transmission as an optical signal to the detector coupled thereto;

3. each detector detecting and measuring the optical signal strength of the optical signal arriving on the fibers coupled thereto, producing a strength output signal related to the optical signal strength of each optical signal, and providing the strength output signal to a microprocessor programmed to calculate the direction to the radiating source;

4. the start detector measuring a property and producing a start output signal related to the length of the start fiber through which the optical signal was transmitted;

5. the stop detector measuring the property and producing a stop output signal related to the length of the stop fiber through which the optical signal was transmitted;

6. providing input to a device measuring a difference between the start output signal and the stop output signal, and providing information on the difference to the microprocessor, 7. calculating with the programmed microprocessor the direction to the radiating source from the strength output signal and the difference between the property related to the length of the fiber for the start and stop signals. The method may be varied as described in the foregoing description of the system.

Having described the invention above, various modifications of the techniques, procedures, material and equipment will be apparent to those in the art. It is intended that all such variations within the scope and spirit of the appended claims be embraced thereby.

What is claimed is:

1. A system for determining the direction to a radiating source relative to a moving vehicle deploying the system and for providing information to a guidance system for the vehicle, by reference to an optical source signal received from the radiating source at a subarray of apertures, the system comprising:

an array of apertures arrayed at selected positions on the vehicle;

a plurality of start optical fibers, each start optical fiber having substantially the same length, each start fiber having a first, radiation receiving end and a second end coupled to a start detector;

a plurality of stop optical fibers, each stop fiber having a selected length equal to or greater than the length of the start fibers, each stop fiber having a first, radiation receiving end and a second end coupled to a stop detector, one start fiber and at least one stop fiber being coupled together to form a set of fibers, one set of fibers being disposed at each aperture, all the fibers in each set of fibers having the same selected numerical aperture and being directed in the same selected direction relative to the vehicle, and the apertures having a selected degree of overlap with adjacent apertures;

the first radiation receiving end of each set of fibers adapted to receive the optical source signal for transmission as an optical signal to the detector coupled thereto;

each detector being adapted to detect and measure the optical signal strength of the optical signal arriving on the fibers coupled thereto, adapted to produce a strength output signal related to the optical signal strength of each optical signal, and adapted to provide the strength output signal to a microprocessor;

the start detector being adapted to measure a property and produce a start output signal related to the length of the start fiber through which the optical signal has been transmitted;

the stop detector being adapted to measure the property and produce a stop output signal related to the length of the stop fiber through which the optical signal has been transmitted;

wherein the start output signal and the stop output signal provide input to a device which measures a difference in the apparent phase between the start output signal and the stop output signal, and provides information on this difference to the microprocessor, the microprocessor being programmed to calculate the direction to the radiating source from the strength output signal and the difference in the apparent phase of the start and stop signals.

2. A system as claimed in claim 1, wherein the first light receiving end of each optical fiber includes no separate light gathering apparatus.

3. A system as claimed in claim 1, wherein the vehicle is a guided missile and the source signal is laser light reflected from a target toward which the missile is directed.

4. A system as claimed in claim 3, wherein the laser light is in a spectral range from ultraviolet to far infrared light.

5. A system as claimed in claim 1, wherein the at least one stop fiber in the set of fibers includes an azimuth stop fiber and an elevation stop fiber, the azimuth stop fiber being coupled to an azimuth stop detector, and the elevation stop fiber being coupled to an elevation stop detector.

6. A system as claimed in claim 5, wherein the azimuth stop detector measures the property and produces an azimuth stop output signal related to the length of the azimuth stop fiber through which the optical signal has been transmitted, and the elevation stop detector measures the property and produces an elevation stop output signal related to the length of the elevation stop fiber through which the optical signal has been transmitted.

7. A system as claimed in claim 1, wherein each stop fiber in the set of fibers includes a splitter for splitting the optical signal into at least two portions, in which one portion is an azimuth stop signal carried to an azimuth stop detector and one portion is an elevation stop signal carried to an elevation stop detector.

8. A system as claimed in claim 7, wherein the azimuth stop detector measures the property and produces an azimuth stop output signal related to the length of the azimuth stop fiber through which the optical signal has been transmitted, and the elevation stop detector measures the property and produces an elevation stop output signal related to the length of the elevation stop fiber through which the optical signal has been transmitted.

9. A system as claimed in claim 1, wherein each fiber includes a splitter for splitting the optical signal into three portions, in which one portion is a start signal carried to the start detector, one portion is an azimuth stop signal carried to an azimuth stop detector, and one portion is an elevation stop signal carried to an elevation stop detector, the three portions comprising a set of fibers.

10. A system as claimed in claim 9, wherein the start detector measures the property and produces a start output signal related to the length of the start fiber through which the optical signal has been transmitted, the azimuth stop detector measures the property and produces an azimuth stop output signal related to the length of the azimuth stop fiber through which the optical signal has been transmitted, and the elevation stop detector measures the property and produces an elevation stop output signal related to the length of the elevation stop fiber through which the optical signal has been transmitted.

11. A system as claimed in claim 1, wherein the set of fibers comprises an integral multiple of start fibers, an equivalent number of azimuth stop fibers, and an equivalent number of elevation stop fibers.

12. A system as claimed in claim 11, wherein the range of integral multiples is from 2 to 100 fibers.

13. A system as claimed in claim 12, wherein the set of fibers comprises an integral multiple of start fibers, a greater number of azimuth stop fibers, and a number of elevation stop fibers equivalent to the number of azimuth stop fibers.

14. A system as claimed in claim 12, wherein the set of fibers comprises an integral multiple of start fibers, a greater number of azimuth stop fibers, and a number of elevation stop fibers greater than the number of start fibers but less than the number of azimuth stop fibers.

15. A system as claimed in claim 12, wherein the set of fibers comprises an integral multiple of start fibers, a greater number of elevation stop fibers, and a number of azimuth stop fibers greater than the number of start fibers but less than the number of elevation stop fibers.

16. A method for determining the direction to a radiating source relative to a moving vehicle deploying the system and for providing directional information to a guidance system for the vehicle, by reference to an optical source signal received from the radiating source at a subarray of apertures, the method comprising the steps of:

arraying a plurality of apertures at selected positions on the vehicle, providing a plurality of start optical fibers, each start optical fiber having substantially the same length, each start fiber having a first, radiation receiving end and a second end coupled to a start detector;

providing a plurality of stop optical fibers, each stop fiber having a selected length equal to or greater than the length of the start fibers, each stop fiber having a first, radiation receiving end and a second end coupled to a stop detector, one start fiber and at least one stop fiber being coupled together to form a set of fibers, one set of fibers being disposed at each aperture, all the fibers in each set of fibers having the same numerical aperture and being directed in the same direction relative to the vehicle, and the first radiation receiving end of each set of fibers receiving the optical source signal for transmission as an optical signal to the detector coupled thereto;

each detector detecting and measuring the optical signal strength of the optical signal arriving on the fibers coupled thereto, producing a strength output signal related to the optical signal strength of each optical signal, and providing the strength output signal to a microprocessor programmed to calculate the direction to the radiating source;

the start detector producing a start output signal related to the length of the start fiber through which the optical signal was transmitted;

the stop detector producing a stop output signal related to the length of the stop fiber through which the optical signal was transmitted;

providing input to a device measuring an apparent phase difference between the start output signal and the stop output signal, and providing information on the difference to the microprocessor, calculating with the microprocessor the direction to the radiating source from the strength output signal and the apparent phase difference between the start output signal and the stop output signal.

17. A method as claimed in claim 16, wherein the first light receiving end of each optical fiber includes no separate light gathering apparatus.

18. A method as claimed in claim 16, wherein the vehicle is a guided missile and the source signal is laser light reflected from a target toward which the missile is directed.

19. A method as claimed in claim 18, wherein the laser light is in a spectral range from ultraviolet to far infrared light.

20. A method as claimed in claim 16, wherein the at least one stop fiber in the set of fibers includes an azimuth stop fiber and an elevation stop fiber, the azimuth stop fiber being coupled to an azimuth stop detector, and the elevation stop fiber being coupled to an elevation stop detector.

21. A method as claimed in claim 20, wherein the azimuth stop detector measures the property and produces an azimuth stop output signal related to the length of the azimuth stop fiber through which the optical signal has been transmitted, and the elevation stop detector measures the property and produces an elevation stop output signal related to the length of the elevation stop fiber through which the optical signal has been transmitted.

22. A method as claimed in claim 16, wherein each stop fiber in the set of fibers includes a splitter for splitting the optical signal into at least two portions, in which one portion is an azimuth stop signal carried to an azimuth stop detector and one portion is an elevation stop signal carried to an elevation stop detector.

23. A method as claimed in claim 22, wherein the azimuth stop detector measures the property and produces an azimuth stop output signal related to the length of the azimuth stop fiber through which the optical signal has been transmitted, and the elevation stop detector measures the property and produces an elevation stop output signal related to the length of the elevation stop fiber through which the optical signal has been transmitted.

24. A method as claimed in claim 16, wherein each fiber includes a splitter for splitting the optical signal into three portions, in which one portion is a start signal carried to the start detector, one portion is an azimuth stop signal carried to an azimuth stop detector, and one portion is an elevation stop signal carried to an elevation stop detector, the three portions comprising a set of fibers.

25. A method as claimed in claim 24, wherein the start detector measures the property and produces a start output signal related to the length of the start fiber through which the optical signal has been transmitted, the azimuth stop detector measures the property and produces an azimuth stop output signal related to the length of the azimuth stop fiber through which the optical signal has been transmitted, and the elevation stop detector measures the property and produces an elevation stop output signal related to the length of the elevation stop fiber through which the optical signal has been transmitted.

26. A method as claimed in claim 16, wherein the set of fibers comprises an integral multiple of start fibers, an equivalent number of azimuth stop fibers, and an equivalent number of elevation stop fibers.

27. A method as claimed in claim 26, wherein the range of integral multiples is from 2 to 100 fibers.

28. A method as claimed in claim 27, wherein the set of fibers comprises an integral multiple of start fibers, a greater number of azimuth stop fibers, and a number of elevation stop fibers equivalent to the number of azimuth stop fibers.

29. A method as claimed in claim 27, wherein the set of fibers comprises an integral multiple of start fibers, a greater number of azimuth stop fibers, and a number of elevation stop fibers greater than the number of start fibers but less than the number of azimuth stop fibers.

30. A method as claimed in claim 27, wherein the set of fibers comprises an integral multiple of start fibers, a greater number of elevation stop fibers, and a number of azimuth stop fibers greater than the number of start fibers but less than the number of elevation stop fibers.

31. A method as claimed in claim 16, wherein the steps of providing a plurality of start and stop optical fibers includes selecting the numerical aperture for the set of fibers.

32. A method as claimed in claim 16, wherein the steps of providing a plurality of start and stop optical fibers includes selecting the degree of overlap between fibers in adjacent apertures.

33. A method as claimed in claim 16, wherein the steps of providing a plurality of start and stop optical fibers includes selecting the number of apertures arrayed in each selected direction.

34. A system for determining the direction to a radiating source relative to a moving vehicle deploying the system and for providing information to a guidance system for the vehicle, by reference to an optical source signal received from the radiating source at a subarray of apertures, the system comprising:

an array of apertures, arrayed at selected locations on the vehicle;

a plurality of first and second optical fibers, each optical fiber being provided with no separate light gathering device, each optical fiber being capable of detecting laser radiation over a certain field of view, the field of view of each optical fiber overlapping the field of view of its neighbors, with all first optical fibers being of substantially the same length and the lengths of the second optical fibers being of equal or greater length in order to form different transit times, and at least one first optical fiber and at least one second optical fiber forming a set of fibers at each aperture, each set of fibers having substantially the same field of view and being directed in the same direction;

first and second detectors having opto-electrical transducers and coupled respectively to the first and second wave guides; each detector being adapted to detect and measure the optical signal strength of the optical signal arriving on the fibers coupled thereto, adapted to produce a strength output signal related to the optical signal strength of each optical signal, and adapted to provide the strength output signal to a microprocessor;

the first detector being adapted to produce a first output signal related to the length of the first optical fiber through which the optical signal has been transmitted;

the second detector being adapted to produce a second output signal related to the length of the second fiber through which the optical signal has been transmitted;

wherein the first output signal and the second output signal provide input to a device which measures an apparent phase difference between the first output signal and the second output signal, and provides information on this difference to the microprocessor, the microprocessor being programmed to calculate the direction to the radiating source from the strength output signal and the apparent phase difference between the start and stop signals.

35. A system as claimed in claim 34, wherein the vehicle is a guided missile and the source signal is laser light reflected from a target toward which the missile is directed.

36. A system as claimed in claim 35, wherein the laser light is in a spectral range from ultraviolet to far infrared light.

37. A system as claimed in claim 34, wherein the at least one stop fiber in the set of fibers includes an azimuth stop fiber and an elevation stop fiber, the azimuth stop fiber being coupled to an azimuth stop detector, and the elevation stop fiber being coupled to an elevation stop detector.

38. A system as claimed in claim 37, wherein the azimuth stop detector measures the property and produces an azimuth stop output signal related to the length of the azimuth stop fiber through which the optical signal has been transmitted, and the elevation stop detector measures the property and produces an elevation stop output signal related to the length of the elevation stop fiber through which the optical signal has been transmitted.

39. A system as claimed in claim 34, wherein each stop fiber in the set of fibers includes a splitter for splitting the optical signal into at least two portions, in which one portion is an azimuth stop signal carried to an azimuth stop detector and one portion is an elevation stop signal carried to an elevation stop detector.

40. A system as claimed in claim 39, wherein the azimuth stop detector measures the property and produces an azimuth stop output signal related to the length of the azimuth stop fiber through which the optical signal has been transmitted, and the elevation stop detector measures the property and produces an elevation stop output signal related to the length of the elevation stop fiber through which the optical signal has been transmitted.

41. A system as claimed in claim 34, wherein each fiber includes a splitter for splitting the optical signal into three portions, in which one portion is a start signal carried to the start detector, one portion is an azimuth stop signal carried to an azimuth stop detector, and one portion is an elevation stop signal carried to an elevation stop detector, the three portions comprising a set of fibers.

42. A system as claimed in claim 41, wherein the start detector measures the property and produces a start output signal related to the length of the start fiber through which the optical signal has been transmitted, the azimuth stop detector measures the property and produces an azimuth stop output signal related to the length of the azimuth stop fiber through which the optical signal has been transmitted, and the elevation stop detector measures the property and produces an elevation stop output signal related to the length of the elevation stop fiber through which the optical signal has been transmitted.

43. A system as claimed in claim 34, wherein the set of fibers comprises an integral multiple of start fibers, an equivalent number of azimuth stop fibers, and an equivalent number of elevation stop fibers.

44. A system as claimed in claim 43, wherein the range of integral multiples is from 2 to 100 fibers each of start fibers, azimuth stop fibers, and elevation stop fibers.

45. A system as claimed in claim 34, wherein the set of fibers comprises an integral multiple of start fibers, a greater number of azimuth stop fibers, and a number of elevation stop fibers equivalent to the number of azimuth stop fibers.

46. A system as claimed in claim 34, wherein the set of fibers comprises an integral multiple of start fibers, a greater number of azimuth stop fibers, and a number of elevation stop fibers greater than the number of start fibers but less than the number of azimuth stop fibers.

47. A system as claimed in claim 34, wherein the set of fibers comprises an integral multiple of start fibers, a greater number of elevation stop fibers, and a number of azimuth stop fibers greater than the number of start fibers but less than the number of elevation stop fibers.

* * * * *